United States Patent
Kumamoto et al.

(10) Patent No.: US 6,521,725 B2
(45) Date of Patent: Feb. 18, 2003

(54) PROCESS FOR PRODUCING CATALYST FOR OLEFIN POLYMERIZATION AND PROCESS FOR PRODUCING OLEFIN POLYMER

(75) Inventors: Shin-ichi Kumamoto, Ichihara (JP); Makoto Satoh, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 48 days.

(21) Appl. No.: 09/809,089

(22) Filed: Mar. 16, 2001

(65) Prior Publication Data

US 2001/0031696 A1 Oct. 18, 2001

(30) Foreign Application Priority Data

Mar. 30, 2000 (JP) .................................. 2000-093949
Mar. 30, 2000 (JP) .................................. 2000-093955

(51) Int. Cl.[7] .................. C08F 10/02; C08F 4/42; C08F 4/609
(52) U.S. Cl. .................. 526/124.3; 526/142; 526/348; 526/125.1; 526/119; 502/103; 502/118; 502/125; 502/126
(58) Field of Search .................. 526/142, 124.3, 526/348, 125.1, 119; 502/103, 118, 125, 126

(56) References Cited

U.S. PATENT DOCUMENTS

| | | | | |
|---|---|---|---|---|
| 4,402,863 A | * | 9/1983 | Miyazaki et al. | ........ 252/429 B |
| 4,701,505 A | * | 10/1987 | Fujii et al. | ................... 526/125 |
| 4,762,898 A | * | 8/1988 | Matsuura et al. | ............ 526/125 |

FOREIGN PATENT DOCUMENTS

| | | |
|---|---|---|
| EP | 0646605 | 4/1995 |
| EP | 0 646 605 A1 * | 4/1995 |
| EP | 0 685 497 * | 12/1995 |
| EP | 0452156 | 8/1997 |
| EP | 0942007 | 9/1999 |
| GB | 2130225 | 5/1984 |
| GB | 2 130 225 A * | 5/1984 |
| JP | 61 231008 A * | 10/1986 |
| JP | 1180234 | 3/1999 |
| JP | 2940993 | 6/1999 |
| JP | 11-228628 * | 8/1999 |
| JP | 11322833 | 11/1999 |

OTHER PUBLICATIONS

Database CA 'Online! Chemical Abstracts Service, Columbus, Ohio, US; Kato, Koichi et al: "Catalysts for stereoregular polymerization of olefins" XP002180397, *abstract* & JP 61 231008 A, Oct. 15, 1986.
European Search Report dated Oct. 17, 2001*.

* cited by examiner

Primary Examiner—David W. Wu
Assistant Examiner—Ling-Siu Choi
(74) Attorney, Agent, or Firm—Stevens, Davis, Miller & Mosher, L.L.P.

(57) ABSTRACT

There are disclosed:
(1) a process for producing a catalyst for olefin polymerization, which comprises the step of contacting with one another:
  (i) a solid catalyst component containing at least titanium, magnesium and halogen atoms,
  (ii) an organoaluminum compound, and
  (iii) a compound selected from the group consisting of (a) an oxygen-containing compound having a structure wherein at least two hydrocarbyloxy groups are bound to the same carbon atom, and (b) a cyclic ketone compound, and
(2) a process for producing an olefin polymer, which comprises the step of polymerizing an olefin in the presence of the above-mentioned catalyst.

8 Claims, No Drawings

PROCESS FOR PRODUCING CATALYST FOR OLEFIN POLYMERIZATION AND PROCESS FOR PRODUCING OLEFIN POLYMER

FIELD OF THE INVENTION

The present invention relates to a process for producing a catalyst for olefin polymerization, and a process for producing an olefin polymer.

BACKGROUND OF THE INVENTION

An ethylene polymer having a low content of a lower molecular weight component is desired from a viewpoint of properties of films obtained therefrom such as, for example, transparency, impact resistance and blocking resistance.

As a polymerization catalyst having a superior catalyst efficiency, there is known a catalyst comprising (i) a solid catalyst component obtained from a combination of a specific magnesium compound and (ii) a specific titanium compound (cf., for example, JP-B46-34092, JP-B47-41676, JP-B55-23561and JP-B 57-24361). However, an ethylene polymer obtained using such a catalyst is not satisfactory from a viewpoint of blocking resistance.

Further, as a polymerization catalyst for producing a highly crystalline propylene polymer, there is known a catalyst comprising a solid catalyst component obtained using an oxygen-containing electron donor such as an ester as an internal donor (cf., for example, JP-B 52-39431, JP-B 52-36786, JP-B 1-28049 and JP-B 3-43283). However, a copolymer of ethylene and an α-olefin obtained using such a catalyst is also unsatisfactory from a viewpoint of blocking resistance.

Furthermore, JP-A 11-80234 and JP-A 11-322833 disclose a catalyst for ethylene polymerization, which can produce an ethylene polymer having a low content of a lower molecular weight component. However, from a viewpoint of increasing quality of the ethylene polymer, an ethylene polymer having a further low content of a lower molecular weight component is desired.

SUMMARY OF THE INVENTION

It is an object of the present invention to provide a process for producing a catalyst for olefin polymerization, which can produce an olefin polymer having a low content of a lower molecular weight component.

It is another object of the present invention to provide a process for producing an olefin polymer having a low content of a lower molecular weight component.

The present invention provides a process for producing a catalyst for olefin polymerization, which comprises the step of contacting with one another:

(i) a solid catalyst component containing at least titanium, magnesium and halogen atoms, (ii) an organoaluminum compound, and (iii) a compound selected from the group consisting of (a) an oxygen-containing compound having a structure wherein at least two hydrocarbyloxy groups are bound to the same carbon atom, and (b) a cyclic ketone compound.

The present invention also provides a process for producing an olefin polymer, which comprises the steps of:

(1) contacting with one another (i) a solid catalyst component containing at least titanium, magnesium and halogen atoms, (ii) an organoaluminum compound and (iii) a compound selected from the group consisting of (a) an oxygen-containing compound having a structure wherein at least two hydrocarbyloxy groups are bound to the same carbon atom and (b) a cyclic ketone compound to obtain a catalyst for olefin polymerization, and (2) polymerizing an olefin in the presence of the obtained catalyst for olefin polymerization to obtain an olefin polymer.

DETAILED DESCRIPTION OF THE INVENTION

Oxygen-containing Compound

An "oxygen-containing compound" used in the present invention means a compound having a structure wherein at least two hydrocarbyloxy groups are bound to the same carbon atom. Preferable examples of the hydrocarbyloxy group are alkoxy, aralkyloxy and aryloxy groups. Of these, more preferable is an alkoxy group, and particularly preferable is a methoxy group. A preferable oxygen-containing compound is a compound having a structure wherein two hydrocarbyloxy groups mentioned above are bound to the same carbon atom.

A more preferable oxygen-containing compound is that represented by the following formula,

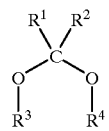

wherein $R^1$ and $R^2$ are independently of each other a hydrogen atom or a hydrocarbon group having 1 to 20 carbon atoms, and $R^1$ and $R^2$ may be bound to each other to form a ring, and $R^3$ and $R^4$ are independently of each other a hydrocarbon group having 1 to 20 carbon atoms.

As $R^1$, $R^2$, $R^3$ and $R^4$, alkyl, aryl and aralkyl groups are preferable.

Specific examples of the alkyl group are methyl, ethyl, n-propyl, i-propyl, n-butyl, sec-butyl, tert-butyl, i-butyl, n-pentyl, neopentyl, n-hexyl, n-octyl, n-decyl, n-dodecyl, n-pentadecyl, n-eicoscy, cyclopropyl, cyclobutyl, cyclopentyl, cyclohexyl and cycloheptyl groups. Of these, methyl, ethyl, n-propyl, i- propyl, n-butyl, tert-butyl, i-butyl, cyclopentyl and cyclohexyl groups are preferred.

The above-mentioned alkyl group may be substituted with a halogen atom such as fluorine, chlorine, bromine and iodine atoms. Specific examples of the alkyl group substituted with the halogen atom are fluoromethyl, difluoromethyl, trifluoromethyl, chloromethyl, dichloromethyl, trichloromethyl, bromomethyl, dibromomethyl, tribromomethyl, iodomethyl, diiodomethyl, triiodomethyl, fluoroethyl, difluoroethyl, trifluoroethyl, tetrafluoroethyl, pentafluoroethyl, chloroethyl, dichloroethyl, trichloroethyl, tetrachloroethyl, pentachloroethyl, bromoethyl, dibromoethyl, tribromoethyl, tetrabromoethyl, pentabromoethyl, perfluoropropyl, perfluorobutyl, perfluoropentyl, perfluorohexyl, perfluorooctyl, perfluorododecyl, perfluoropentadecyl, perfluoroeicosyl, perchloropropyl, perchlorobutyl, perchloropentyl, perchlorohexyl, perchlorooctyl, perchlorododecyl, perchloropentadecyl, perchloroeicosyl, perbromopropyl, perbromobutyl, perbromopentyl, perbromohexyl, perbromooctyl, perbromododecyl, perbromopentadecyl and perbromoeicosyl groups.

As the above-mentioned aryl group, preferred is an aryl group having 6 to 20 carbon atoms. Specific examples of the aryl group are phenyl, 2-tolyl, 3-tolyl, 4-tolyl, 2,3-xylyl, 2,4-xylyl, 2,5-xylyl, 2,6-xylyl, 3,4-xylyl, 3,5-xylyl, 2,3,4-trimethylphenyl, 2,3,5-trimethylphenyl, 2,3,6-trimethylphenyl, 2,4,6-trimethylphenyl, 3,4,5-trimethylphenyl, 2,3,4,5-tetramethylphenyl, 2,3,4,6-tetramethylphenyl, 2,3,5,6-tetramethylphenyl, pentamethylphenyl, ethylphenyl, n-propylphenyl, i-propylphenyl, n-butylphenyl, sec-butylphenyl, tert-butylphenyl, n-pentylphenyl, neopentylphenyl, n-hexylphenyl, n-octylphenyl, n-decylphenyl, n-dodecylphenyl, n-tetradecylphenyl, naphthyl and anthracenyl groups. Of these, a phenyl group is more preferred.

The aryl group may be substituted partially with a halogen atom such as fluorine, chlorine, bromine and iodine atoms.

As the above-mentioned aralkyl group, preferred is that having 7 to 20 carbon atoms. Specific examples of the aralkyl group are benzyl, (2-methylphenyl)methyl, (3-methylphenyl)methyl, (4-methylphenyl)methyl, (2,3-dimethylphenyl)methyl, (2,4-dimethylphenyl)methyl, (2,5-dimethylphenyl)methyl, (2,6-dimethylphenyl)methyl, (3,4-dimethylphenyl)methyl, (3,5-dimethylphenyl)methyl, (2,3,4-trimethylphenyl)methyl, (2,3,5-trimethylphenyl)methyl, (2,3,6-trimethylphenyl)methyl, (3,4,5-trimethylphenyl)methyl, (2,4,6-trimethylphenyl)methyl, (2,3,4,5-tetramethylphenyl)methyl, (2,3,4,6-tetramethylphenyl)methyl, (2,3,5,6-tetramethylphenyl)methyl, (pentamethylphenyl)methyl, (ethylphenyl)methyl, (n-propylphenyl)methyl, (i-propylphenyl)methyl, (n-butylphenyl)methyl, (sec-butylphenyl)methyl, (tert-butylphenyl)methyl, (n-pentylphenyl)methyl, (neopentylphenyl)methyl, (n-hexylphenyl)methyl, (n-octylphenyl)methyl, (n-decylphenyl)methyl, (n-tetradecylphenyl)methyl, naphtylmethyl and anthracenylmethyl groups. Of these, a benzyl group is more preferred.

The aralkyl group may be substituted partially with a halogen atom such as fluorine, chlorine, bromine and iodine atoms.

As $R^1$ and $R^2$, a hydrogen atom and methyl, ethyl, n-propyl, i-propyl, n-butyl, i-butyl, tert-butyl, cyclopentyl and cyclohexyl groups are preferable.

When $R^1$ and $R^2$ are bound to each other to form a ring, a preferred ring structure is a cycloheptane ring structure or a cyclohexane ring structure.

As $R^3$ and $R^4$, methyl and ethyl groups are preferred, and a methyl group is particularly preferred.

Examples of the oxygen-containing compound are dimethoxymethane, diethoxymethane, di-n-propoxymethane, di-i-propoxymethane, di-n-butoxymethane, diphenoxymethane, 1,1-dimethoxyethane, 1,1-dimethoxypropane, 1,1-dimethoxybutane, propionaldehyde dimethylacetal, 2-methyl-1,1-dimethoxypropane, 2,2-dimethyl-1,1-methoxypropane, 3-methyl-i,1-dimethoxypropane, 3,3-dimethyl-1,1-dimethoxypropane, 1,1-dimethoxybutane, 1,1-dimethoxypentane, n-octylaldehyde dimethylacetal, benzaldehyde dimethylacetal, phenyacetaldehyde dimethylacetal, 2,2-dimethoxypropane, 2,2-dimethoxybutane, 3-methyl-2,2-dimethoxybutane, 3,3-dimethyl-2,2-dimethoxybutane, 2,2-dimethoxypentane, 2,2-dimethoxyoctane, 2,2-dimethoxydecane, 3,3-dimethoxypentane, 4-methyl-3,3-dimethoxypentane, 4,4-dimethyl-3,3-dimethoxypentane, 2,4-dimethyl-3,3-dimethoxypentane, 2,2,4,4-tetramethyl-3,3-dimethoxypentane, 3,3-dimethoxyhexane, 5-methyl-3,3-dimethoxyhexane, 5,5-dimethyl-3,3-dimethoxyhexane, 3,3-dimethoxypentane, 3,3-dimethoxydecane, diphenyldimethoxymethane, dicycopentyldimethoxymethane, dicyclohexyldimethoxymethane, 1-pheny-1,1-dimethoxyethane, 1-cyclopentyl-1,1-dimethoxyethane, 1-cyclohexyl-1,1-dimethoxyethane, 1-cyclohexyl-1,1-dimethoxypropane, 1-cyclohexyl-2-methyl-1,1-dimethoxypropane, 1-cyclohexyl-2,2-dimethyl-1,1-dimethoxypropane, trimethoxymethane, 1,1,1-trimethoxyethane, 1,1,2-trimethoxyethane, 1,1,1-trimethoxypropane, 1,1,2-trimethoxypropane, 1,1,3-trimethoxypropane, 1,1,1-trimethoxypentane, 1,1,2,2-tetramethoxyethane, 1,1,3,3-tetramethoxypropane, 2-methyl-1,1,3,3-tetramethoxypropane, 2,2-dimethyl-1,1,3,3-tetramethoxypropane, 1,1-dimethoxycyclobutane, 1,1-dimethoxycyclopentane, 1,1-dimethoxycyclohexane, 1,1,2-trimethoxycyclohexane, 1,1,2,2-tetramethoxycyclohexane and 1,1,3,3-tetramethoxycyclohexane.

As the oxygen-containing compounds, a saturated aliphatic ketone, and an acetal obtained from a saturated aliphatic aldehyde and an alcohol are more preferable. Of these, a saturated aliphatic ketone, and an acetal obtained from a saturated aliphatic aldehyde and methanol are particularly preferable. In particular, dimethoxymethane, 1,1-dimethoxymethane, propionaldehyde dimethylacetal, n-octylaldehyde dimethylacetal, 2,2-dimethoxypropane, 3,3-dimethoxyhexane and 1,1-dimethoxycyclohexane are preferable.

The oxygen-containing compound is used in an amount of usually from 1 mol to 2000 mol, and particularly preferably from 5 mol to 1000 mol, per mol of the titanium atom in the solid catalyst component. And, the oxygen-containing compound is used in an amount of usually from 0.001 mol to 10 mol, and particularly preferably from 0.01 mol to 5 mol, per mol of the aluminum atom in the organoaluminum compound.

Cyclic Ketone Compound

A "cyclic ketone compound" used in the present invention means a compound having a carbonyl group in its carbon ring. The ring may be either a saturated or unsaturated aliphatic ring or a saturated or unsaturated aromatic ring. The ring may be either monocyclic or polycyclic. A 3–10-membered ring is preferable, and a 5- to 8-membered ring is more preferable.

Specific examples of the cyclic ketone compounds are those represented by the following formulas.

In the above formula, X is a hydrogen atom, a hydrocarbon group, a hydrocarbyloxy group or an amino group substituted with two hydrocarbon groups. Respective X's in the molecule may be

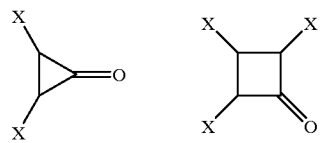

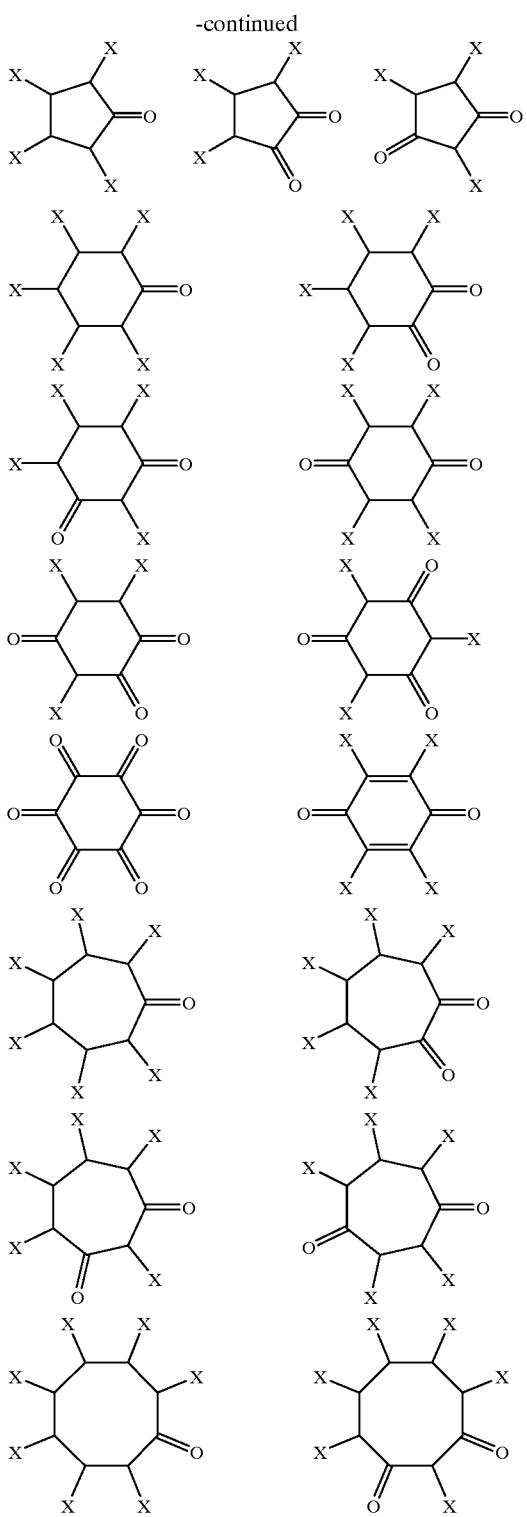

bound to one another. Alternatively, the cyclic ketone compounds may be those formed by binding two or more compounds selected from the above-mentioned compounds to one another at their X portions.

Particularly preferred cyclic ketone compounds are 1,4-cyclohexanedione, 1,3-cyclohexanedione, 1,2-cyclohexanedione and 1,4-benzoquinone.

The cyclic ketone compound is used in an amount of usually from 1 mol to 2000 mol, and particularly preferably from 5 mol to 1000 mol, per mol of the titanium atom in the solid catalyst component. And, the cyclic ketone compound is used in an amount of usually from 0.001 mol to 10 mol, and particularly preferably from 0.01 mol to 5 mol, per mol of the aluminum atom in the organoaluminum compound.

Solid Catalyst Component

A solid catalyst component used in the present invention may be any known solid catalyst component containing titanium, magnesium and halogen atoms.

Examples thereof are those disclosed in JP-B 46-34092, JP-B 47-41676, JP-B 55-23561, JP-B 57-24361, JP-B 52-39431, JP-B 52-36786, JP-B1-28049, JP-B3-43283, JP-A4-80044, JP-A55-52309, JP-A 58-21405, JP-A 61-181807, JP-A 63-142008, JP-A 5-339319, JP-A 54-148093, JP-A 4-227604, JP-A 6-2933, JP-A 64-6006, JP-A 6-179720, JP-B 7-116252, JP-A 8-134124, JP-A 9-31119, JP-A 11-228628, JP-A 11-80234 and JP-A 11-322833.

As the solid catalyst component, preferred are those containing an electron donor in addition to the titanium, magnesium and halogen atoms.

As a process for producing the solid catalyst component, the following processes (1) to (5) can be exemplified:

(1) process comprising the step of contacting a magnesium halide compound and a titanium compound with each other, (2) process comprising the step of contacting a magnesium halide compound, an electron donor and a titanium compound with one another, (3) process comprising the step of dissolving a magnesium halide compound and a titanium compound in an electron donative solvent to obtain a solution, and impregnating a carrier with the solution, (4) process comprising the step of contacting a dialkoxymagnesium compound and a titanium halide compound with each other, and (5) process comprising the step of contacting (a) a solid catalyst component precursor containing a magnesium atom, a titanium atom and a hydrocarbyloxy group, (b) a halogeno compound having a capability of halogenation and (c) an electron donor with one another.

Of these, the process (5) is preferable.

Preferred solid catalyst component precursors are solid products (1) and (2) mentioned below:

(1) solid product obtained by reducing a titanium compound represented by the following formula with an organomagnesium compound in the presence of an organosilicon compound having an Si—O bond,

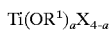

$Ti(OR^1)_aX_{4-a}$ wherein $R^1$ is a hydrocarbon group having 1 to 20 carbon atoms, X is a halogen atom, and "a" is a number satisfying $0 < a \leq 4$ (cf. JP-A 11-80234), and (2) solid product obtained by reducing the titanium compound represented by the above formula with an organomagnesium compound in the presence of an organosilicon compound having an Si—O bond and a porous carrier (cf. JP-B 4-57685).

Examples of $R^1$ in the above formula are alkyl groups such as methyl, ethyl, propyl, i-propyl, butyl, i-butyl, amyl, i-amyl, hexyl, heptyl, octyl, decyl and dodecyl groups; aryl groups such as phenyl, cresyl, xylyl and naphthyl groups; cycloalkyl groups such as cyclohexyl and cyclopentyl groups; alkenyl groups such as an allyl group; and aralkyl groups such as a benzyl group. Among these, alkyl groups having 2 to 18 carbon atoms and aryl groups having 6 to 18 carbon atoms are preferred, and straight-chain alkyl groups having 2 to 18 carbon atoms are particularly preferred. When "a" in the above formula is a number satisfying $2 \leq a \leq 4$, a titanium compound may be one having two or more ($OR^1$) groups different from one another.

As "X" in the above formula, a chlorine atom, a bromine atom and an iodine atom can be exemplified. Of these, a chlorine atom is particularly preferred.

A preferred "a" in the above formula is a number satisfying $2 \leq a \leq 4$, and a particularly preferred "a" is 4.

The titanium compound represented by the above formula can be produced according to a conventional process, such as (i) a process comprising the step of reacting $Ti(OR^1)_4$ with $TiX_4$ in each predetermined proportion, and (ii) a process comprising the step of reacting a corresponding alcohol such as $R^1OH$ with $TiX_4$ in each predetermined amount.

As the above-mentioned organosilicon compound having an Si—O bond, a compound represented by the following formula is preferred.

$$Si(OR^3)_b R^4_{4-b}$$

$$R^5(R^6_2SiO)_c SiR^7_3$$

or $$(R^8_2SiO)_d$$

In the above formulas, $R^3$ is a hydrocarbon group having 1 to 20 carbon atoms, $R^4$, $R^5$, $R^6$, $R^7$ and R3 are independently of one another a hydrocarbon group having 1 to 20 carbon atoms or a hydrogen atom, "b" is a number satisfying $0<b \leq 4$, "c" is an integer of from 1 to 1000, and "d" is an integer of from 2 to 1000.

Specific examples of the organosilicon compound represented by the above formula are tetramethoxysilane, dimethyldimethoxysilane, tetraethoxysilane, triethoxyethylsilane, diethoxydiethylsilane, ethoxytriethylsilane, tetra-i-propoxysilane, di-i-propoxy-di-i-propylsilane, tetrapropoxysilane, dipropoxydipropylsilane, tetrabutoxysilane, dibutoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethylpolysiloxane, diphenylpolysiloxane, methylhydropolysiloxane and phenylhydropolysiloxane.

Among the organosilicon compound represented by the above formula, more preferable are alkoxysilane compounds represented by the formula, $Si(OR^3)_b R^4_{4-b}$. In this formula, "b" is preferably a number satisfying $1 \leq b \leq 4$. Of these, tetraalkoxysilane compounds of b=4 are particularly preferred.

As the above-mentioned organomagnesium compound, any types of organomagnesium compounds having a magnesium-carbon bond can be used. A Grignard compound represented by the following formula and a dihydrocarbyl magnesium compound represented by the following formula are particularly preferred.

$$R^9MgX$$

$$R^{10}R^{11}Mg$$

In the above formulas, Mg is a magnesium atom, $R^9$ is a hydrocarbon group having 1 to 20 carbon atoms, X is a halogen atom, $R^{10}$ and $R^{11}$ are independently of each other a hydrocarbon group having 1 to 20 carbon atoms, and $R^{10}$ and $R^{11}$ may be the same or different from each other.

Specific examples of $R^9$ to $R^{11}$ are alkyl, aryl, aralkyl and alkenyl groups having 1 to 20 carbon atoms such as methyl, ethyl, propyl, i-propyl, butyl, sec-butyl, tert-butyl, i-amyl, hexyl, octyl, 2-ethylhexyl, phenyl and benzyl groups. It is particularly recommendable to use the Grignard compound represented by the above formula in the form of an ether solution thereof from a viewpoint of the catalyst efficiency.

It is permitted to use the organomagnesium compound mentioned above in combination with an organometallic compound to form a hydrocarbon soluble complex. Examples of the organometallic compounds are compounds of Li, Be, B, Al or Zn.

The porous carrier mentioned above may be conventional ones. Examples of the porous carrier are porous inorganic oxides such as $SiO_2$, $Al_2O_3$, MgO, $TiO_2$ and $ZrO_2$; and organic porous polymers such as polystyrene, styrene-divinylbenzene copolymer, styrene-ethylene glycol-methyl dimethacrylate copolymer, polymethyl acrylate, polyethyl acrylate, methyl acrylate-divinylbenzene copolymer, polymethyl methacrylate, methyl methacrylate-divinylbenzene copolymer, polyacrylonitrile, acrylonitrile-divinylbenzene copolymer, polyvinyl chloride, polyethylene and polypropylene. Of these, organic porous polymers are preferred, and styrene-divinylbenzene copolymer and acrylonitrile-divinylbenzene copolymer are particularly preferred.

With respect to the porous carriers, (i) a volume of micro pores having a radius of from 200 to 2000 Å is preferably 0.3 cc/g or more, and more preferably 0.4 cc/g or more, and (ii) a proportion of the volume of micro pores having a radius of from 200 to 2000 Å is preferably 35% or more, and more preferably 40% or more, when a volume of micro pores having a radius of from 35 to 75000 Å is assigned to be 100%. It is not recommendable to use a porous carrier having too small micro pore volume, because the catalyst component is not supported on the carrier effectively. Meanwhile, even if a porous carrier has a micro pore volume of 0.3 cc/g or more, the catalyst component is not supported on the carrier effectively when the porous carrier does not satisfy its micro pore radius of from 200 to 2000 Å.

As a process for reducing the titanium compound with the organomagnesium compound, there are exemplified (1) a process comprising the step of adding the organomagnesium compound dropwise to a mixture of the titanium compound and the organosilicon compound, and (2) a process comprising the step of adding a mixture of the titanium compound and the organosilicon compound dropwise to the organomagnesium compound. In these processes, the porous carrier may be used at the same time.

The titanium compound and the organosilicon compound are preferably dissolved in or diluted with a solvent. Examples of the solvent are aliphatic hydrocarbons such as hexane, heptane, octane and decane; aromatic hydrocarbons such as toluene and xylene; alicyclic hydrocarbons such as cyclohexane, methylcyclohexane and decalin; and ether compounds such as diethyl ether, dibutyl ether, di-i-amyl ether and tetrahydrofuran.

A temperature of the reduction reaction is usually from −50 to 70° C., preferably from −30 to 50° C., and particularly preferably from −25 to 35° C. A time of the dropwise addition is not limited, and it is usually from about 30 minutes to about 6 hours. After the reaction is conducted at that temperature, it is permitted to further carry out a post-reaction at a temperature of from 20 to 120° C.

The organosilicon compound is used in an amount of usually from 1 to 500, preferably from 1 to 300, and particularly preferably from 3 to 100 in terms of an atomic ratio Si/Ti, namely, a ratio of a silicon atom in the organosilicon compound to a titanium atom in the titanium compound.

The organomagnesium compound is used in an amount of usually from 0.1 to 10, preferably from 0.2 to 5.0, and particularly preferably from 0.5 to 2.0 in terms of an atomic ratio (Ti+Si)/Mg, namely, a ratio of the sum of a titanium atom in the titanium compound and a silicon atom in the organosilicon compound to a magnesium atom in the organomagnesium compound.

It is permitted that respective amounts of the titanium compound, the organosilicon compound and the organomagnesium compound are determined so as to make a molar ratio of Mg/Ti in the solid catalyst component from 1 to 51, preferably from 2 to 31, and particularly preferably from 4 to 26.

The solid product obtained by the reduction reaction is usually separated by solid-liquid separation, and washed several times with an inert hydrocarbon solvent such as hexane and heptane. The thus obtained solid product contains a trivalent titanium atom, a magnesium atom and a hydrocarbyloxy group, and it exhibits generally an amorphous or extremely low crystalline property. From a viewpoint of catalyst efficiency, a solid product having an amorphous structure is particularly preferred.

As the halogeno compound having a capability of halogenation, preferred are those capable of substituting the hydrocarbyloxy group of the solid catalyst precursor with a halogen atom. Particularly preferred are halogeno compounds of Group 4 elements, those of Group 13 elements and those of Group 14 elements.

As the halogeno compounds of Group 4 elements, preferred are halogeno compounds of titanium. Specific examples thereof are titanium halide, halogenated titanium oxide and halogenated titanium amide.

As the halogeno compound of Group 13 or 14 elements, preferred are those represented by the following formula,

$MR_{m-a}X_a$ wherein M is an atom belonging to Group 13 or 14, R is a hydrocarbon group having 1 to 20 carbon atoms, X is a halogen atom, m is a valence of M, and "a" is a number satisfying $0 < a \leq m$.

Examples of the atom belonging to Group 13 are B, Al, Ga, In and Tl. Of these, B and Al are preferred, and Al is more preferred. Examples of the atom belonging to Group 14 are C, Si, Ge, Sn and Pb. Of these, Si, Ge and Sn are preferred, and Si and Sn are more preferred. When M is Si, m is 4, and "a" is preferably 3 or 4.

X is F, Cl, Br or I, and, among them, Cl is preferable.

Examples of R are alkyl groups such as methyl, ethyl, n-propyl, i-propyl, n-butyl, i-butyl, amyl, i-amyl, hexyl, heptyl, octyl, decyl and dodecyl groups; aryl groups such as phenyl, tolyl, cresyl, xylyl and naphthyl groups; cycloalkyl groups such as cyclohexyl and cyclopentyl groups; alkenyl groups such as an allyl group; and aralkyl groups such as a benzyl group.

A preferred R in the above formula is the alkyl or aryl group, and a particularly preferred R is methyl, ethyl, n-propyl, phenyl or p-tolyl group.

Specific examples of chloro compounds of Group 13 elements are trichloroboron, methyldichloroboron, ethyldichloroboron, phenyldichloroboron, cyclohexyldichloroboron, dimethylchloroboron, methylethylchloroboron, trichloroaluminum, methyldichloroaluminum, ethyldichloroaluminum, phenyldichloroaluminum, cyclohexyldichloroaluminum, dimethylchloroaluminum, diethylchloroaluminum, methylethylchloroaluminum, ethylaluminum sesquichloride, gallium chloride, gallium dichloride, trichlorogallium, methyldichlorogallium, ethyldichlorogallium, phenyldichlorogallium, cyclohexyldichlorogallium, dimethylchlorogallium, methylethylchlorogallium, indium chloride, indium trichloride, methylindium dichloride, phenylindium dichloride, dimethylindium chloride, thallium chloride, thallium trichloride, methylthallium dichloride, phenylthallium dichloride and dimethylthallium chloride; and compounds named by replacing the chloro in the above named compounds with F, Br or I.

Specific examples of the chloro compounds of Group 14 elements are tetrachloromethane, trichloromethane, dichloromethane, monochloromethane, 1,1,1-trichloroethane, 1,1-dichloroethane, 1,2-dichloroethane, 1,1,2,2-tetrachloroethane, tetrachlorosilane, trichlorosilane, methyltrichlorosilane, ethyltrichlorosilane, n-propyltrichlorosilane, n-butyltrichlorosilane, phenyltrichlorosilane, benzyltrichlorosilane, p-tolyltrichlorosilane, cyclohexyltrichlorosilane, dichlorosilane, methyldichlorosilane, ethyldichlorosilane, dimethyldichlorosilane, diphenyldichlorosilane, methylethyldichlorosilane, monochlorosilane, trimethylchlorosilane, triphenylchlorosilane, tetrachlorogermane, trichlorogermane, methyltrichlorogermane, ethyltrichlorogermane, phenyltrichlorogermane, dichlorogermane, dimethyldichlorogermane, diethyldichlorogermane, diphenyldichlorogermane, monochlorogermane, trimethylchlorogermane, triethylchlorogermane, tri-n-butylchlorogermane, tetrachlorotin, methyltrichlorotin, n-butyltrichlorotin, dimethyldichlorotin, di-n-butyldichlorotin, di-i-butyldichlorotin, diphenyldichlorotin, divinyldichlorotin, methyltrichlorotin, phenyltrichlorotin, dichlorolead, methylchlorolead and phenylchlorolead; and compounds named by replacing the chloro in the above named compounds with F, Br or I.

As the halogeno compound, tetrachlorotitanium, methyldichloroaluminum, ethyldichloroaluminum, tetrachiorosilane, phenyltrichiorosilane, methyltrichiorosilane, ethyltrichlorosilane, n-propyltrichlorosilane and tetrachorotin are particularly preferred from a viewpoint of polymerization activity.

As the halogeno compound, the above-named compounds may be used singly or in combination of two or more.

As the electron donor, there are exemplified oxygen-containing compounds such as alcohols, phenols, ketones, aldehydes, carboxylicacids, organicacidesters, inorganicacid esters, ethers, acid amides and acid anhydrides; and nitrogen-containing compounds such as ammonia, amines, nitriles and isocyanates. Of these, organic acid esters and ethers are preferred.

As the organic acid esters, mono- and poly-carboxylic acid esters are preferred. Examples of said carboxylic acid esters are saturated aliphatic carboxylic acid esters, unsaturated aliphatic carboxylic acid esters, alicyclic carboxylic acid esters and aromatic carboxylic acid esters.

Specific examples of the carboxylic acid esters are methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, di-i-propyl phthalate, di-n-butyl phthalate, di-i-butyl phthalate, di-2-ethylhexyl phthalate, di-n-octyl phthalate and diphenyl phthalate.

As preferred ethers, there are exemplified dialkyl ethers and diether compounds represented by the following formula,

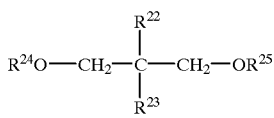

wherein $R^{22}$ to $R^{25}$ are independently of one another an alkyl, aryl or aralkyl group having up to 20 carbon atoms, and $R^{22}$ and $R^{23}$ may be independently of each other a hydrogen atom.

Specific examples of the ethers are dimethyl ether, diethyl ether, dibutyl ether, methyl ethyl ether, methyl butyl ether, methyl cyclohexyl ether, 2,2-dimethyl-1,3-dimethoxypropane, 2,2-diethyl-1,3-dimethoxypropane, 2,2-di-n-butyl-1,3-dimethoxypropane, 2,2-di-i-butyl-1,3-dimethoxypropane, 2-ethyl-2-butyl-1,3-dimethoxypropane, 2-n-propyl-2-cyclopentyl-1,3-dimethoxypropane, 2,2-dimethyl-1,3-diethoxypropane and 2-n-propyl-2-cyclohexyl-1,3-diethoxypropane.

In particular, as the electron donor, the organic acid esters are preferred, dialkyl esters of the aromatic dicarboxylic acid are particularly preferred and dialkyl esters of phthalic acid are most preferred.

The above-named compounds may be used singly or in combination of two or more as the electron donor.

The solid catalyst component precursor, the halogeno compound and the electron donor can be contacted with one another in a conventional method such as a slurry method and a mechanical pulverization method using a ball mill. However, the mechanical pulverization method is not recommendable from an industrial point of view, because a lot of fine powders may be produced to make a particle size distribution of the solid catalyst component obtained broad. Therefore, it is recommendable to contact them in the presence of a medium mentioned below.

The medium is preferably a compound inert to the above-mentioned components to be treated. Examples thereof are aliphatic hydrocarbons such as pentane, hexane, heptane and octane; aromatichydrocarbons such as benzene, toluene and xylene; alicyclic hydrocarbons such as cyclohexane and cyclopentane; and halogenated hydrocarbons such as 1,2-dichloroethane and monochlorobenzene. In particular, aliphatic hydrocarbons are preferred from a viewpoint of polymerization activity of the catalyst obtained.

An amount of the medium used is not particularly limited. However, it is not preferable to use it in an excess amount in view of efficiency or productivity of the catalyst. The amount is usually from 0.1 ml to 1000 ml, preferably from 0.5 ml to 20 ml, and particularly preferably from 1 ml to 5 ml, per g of the solid catalyst component precursor.

The solid obtained by the contacting can be used as it is for the successive treatment. However, it is recommendable to wash the solid optional times with a washing agent, thereby removing impurities contained in the solid.

As the washing agent, those inert to the solid to be washed are preferable, and those similar to the compound exemplified above as the medium can be used.

The washing agent is used in an amount of usually from 0.1 ml to 1000 ml, and preferably from 1 ml to 100 ml per g of the solid catalyst component precursor.

The contacting and washing can be carried out usually at a temperature of from −50 to 150° C., preferably from 0 to 140° C., and more preferably from 60 to 135° C. A contacting time is not particularly limited. It is preferably from 0.5 to 8 hours, and more preferably from 1 to 6 hours. A washing time is not also particularly limited. It is preferably from 1 to 120 minutes, and more preferably from 2 to 60 minutes.

How to contact the solid catalyst component precursor, the halogeno compound and the electron donor is not limited. As examples thereof, the following processes (1) and (2) are enumerated:

(1) a process comprising the step of contacting the solid catalyst component precursor, the halogeno compound and the electron donor with one another at the same time, and (2) aprocess comprising the step of contacting the halogeno compound and the electron donor with the solid catalyst component precursor one after another.

In carrying out the above process (1), there are exemplified the following processes (i) to (v), wherein the process (i) is preferable:

(i) a process comprising the step of adding a mixture of the halogeno compound and the electron donor to the solid catalyst component precursor to effect the contact, (ii) a process comprising the step of adding the solid catalyst component precursor to a mixture of the halogeno compound and the electron donor to effect the contact, (iii) a process comprising the step of adding the halogeno compound and the electron donor in this order to the solid catalyst component precursor to effect the contact, (iv) a process comprising the step of adding the electron donor and the halogeno compound in this order to the solid catalyst component precursor to effect the contact, and (v) a process comprising the step of adding both the halogeno compound and the electron donor at the same time to the solid catalyst component precursor to effect the contact.

In carrying out the above process (2), there are exemplified the following processes (i) and (ii):

(i) a process comprising the steps of adding the halogeno compound to the solid catalyst component precursor to obtain a contact product, washing the contact product, and then adding the electron donor to the washed contact product to complete the conduct, and (ii) a process comprising the steps of adding the electron donor to the solid catalyst component precursor to obtain a contact product, washing the contact product, and then adding the halogeno compound to the washed contact product to complete the conduct.

Alternatively, it is permitted to carry out the contact in a manner such that the solid catalyst component precursor, the halogeno compound and the electron donor are contacted with one another, and then the resulting contact product is contacted with at least one of the halogeno compound and the electron donor.

As a particularly preferred process for contacting the solid catalyst component precursor, the halogeno compound and the electron donor, there are enumerated the following processes (1) to (8):

(1) a process comprising the steps of adding the halogeno compound and the electron donor one after another to the solid catalyst component precursor, washing the resulting contact product, and then adding the halogeno compound to the washed contact product to complete the contact, (2) a process comprising the steps of adding a mixture of the halogeno compound and the electron donor to the solid catalyst component precursor, washing the resulting contact product, and then adding the halogeno compound to the washed contact product to complete the contact, (3) a process comprising the steps of adding the halogeno compound and the electron donor one after another to the solid catalyst component precursor, washing the resulting contact product, and then adding the halogeno compound and the electron donor one after another to the washed contact product to complete the contact, (4) a process comprising the steps of adding a mixture of the halogeno compound and the electron donor to the solid catalyst component precursor, washing the resulting contact product, and then adding a mixture of the halogeno compound and the electron donor to the washed contact product to complete the contact, (5) a process comprising the steps of adding the halogeno compound and the electron donor one after another to the solid catalyst component precursor to complete the contact, (6) a process comprising the steps of adding the halogeno compound to the solid catalyst component precursor, washing the resulting contact product, and then adding the electron donor to the washed contact product to complete the contact, (7) a process comprising the steps of adding the electron donor to the solid catalyst component precursor, washing the resulting contact product, adding the halogeno compound and the electron donor one after another to the washed contact product, washing the resulting contact product, and then adding the halogeno compound and the electron donor one after another to the washed contact product to complete the contact, and (8) a process comprising the steps of adding the electron donor to the solid catalyst component precursor, washing the resulting contact product, adding a mixture of the halogeno compound and the electron donor to the washed contact product, washing the resulting contact product, and then adding a mixture of the halogeno compound and the electron donor to the washed contact product to complete the contact.

In some processes mentioned above wherein the halogeno compounds and the electron donors are used in plural steps, it is permitted to use the halogeno compounds and the electron donors, which are the same or different from one another, respectively.

An amount of the halogeno compound used per contact is usually from 0.1 to 1000 mmol, preferably from 0.3 to 500 mmol, and particularly preferably from 0.5 to 300 mmol, per g of the solid catalyst component precursor.

An amount of the electron donor used per contact is usually from 0.1 to 1000 mmol, preferably from 0.3 to 500 mmol, and particularly preferably from 0.5 to 300 mmol, per g of the solid catalyst component precursor.

In the above-mentioned contact, a molar ratio of the electron donor to the halogeno compound is preferably from 0.01 to 200, and more preferably from 0.1 to 100.

When used for the polymerization, the solid catalyst component obtained may be combined with an inert diluent to form a slurry, or dried to obtain a flowing powder.

Pre-polymerization Treatment

In the present invention, the solid catalyst component may be used for polymerization as it is, which polymerization is hereinafter referred to as "real polymerization". Alternatively, the solid catalyst component may be subjected to pre-polymerization treatment, thereby obtaining a pre-polymerized catalyst component, which is then used for the real polymerization. In carrying out the pre-polymerization, for example, the solid catalyst component and an organoaluminum compound are contacted with an olefin. Examples of the olefin used for the pre-polymerization are ethylene, propylene and butene-1. The pre-polymerization may be either homopolymerization or copolymerization.

In order to obtain a highly crystalline pre-polymer, which is a polymer obtained by the pre-polymerization, it is permitted to use a conventional electron donor or hydrogen at the same time in the pre-polymerization treatment. A preferred electron donor is an organic compound having an Si—OR bond, wherein R is a hydrocarbon group having 1 to 20 carbon atoms.

In the pre-polymerization treatment, it is recommendable to make a slurry containing the solid catalyst component using a solvent. Examples of the solvent are aliphatic hydrocarbons such as butane, pentane, hexane and heptane, and aromatic hydrocarbons such as toluene and xylene.

A concentration of the slurry is usually from 0.001 to 0.5 g-solid catalyst component/ml-solvent, and particularly preferably from 0.01 to 0.3 g-solid catalyst component/ml-solvent. The organoaluminum compound is used in an amount of preferably from 0.1 to 100, and particularly preferably from 0.5 to 50, in terms of Al/Ti atomic ratio, namely, an atomic ratio of the Al atom in the organoaluminum compound to the Ti atom in the solid catalyst component.

A temperature of the pre-polymerization treatment is usually from −30 to 80° C., and particularly preferably from −10 to 50° C. Yield of the pre-polymer is usually from 0.1 to 300 g, and particularly preferably from 0.5 to 50 g, per g of the solid catalyst component.

When used for the real polymerization, the pre-polymerized solid catalyst component obtained may be combined with an inert diluent to form a slurry, or dried to obtain a flowing powder.

Organoaluminum Compound

The "organoaluminum compound" used in the present invention means a compound having at least one Al-carbon bond in the molecule. Typical examples thereof are those represented by the following formulas,

and

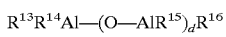

wherein $R^{12}$, $R^{13}$, $R^{14}$, $R^{15}$ and $R^{16}$ are independently of one another a hydrocarbon group having 1 to 8 carbon atoms, Y is a halogen atom, a hydrogen atom or an alkoxy group, r is a number satisfying $2 \leq r \leq 3$, and d is a number satisfying $1 \leq d \leq 30$.

Specific examples of said compound are trialkylaluminums such as triethylaluminum, tri-n-butylaluminum, tri-i-butylaluminum and trihexylaluminum; dialkylaluminum hydrides such as diethylaluminum hydride, di-n-butylaluminum hydride and di-i-butylaluminum hydride; alkylaluminum dihalides such as ethylaluminum dichloride, n-butylaluminum dichloride and i-butylaluminum dichloride; dialkylaluminum halides such as diethylaluminum chloride, di-n-butylaluminum chloride and di-i- butylaluminum chloride; a mixture of the trialkylaluminum and the dialkylaluminum halide; and alkylalumoxanes such as tetraethyldialumoxane, tetrabutyldialumoxane, polymethylalumoxane and polyethylalumoxane.

Among these, the trialkylaluminum, the mixture of the trialkylaluminum and the dialkylaluminum halide, and the alkylalumoxane are preferred. Triethylaluminum, tri-n-butylaluminum, tri-i-butylaluminum, trihexylaluminum, a mixture of triethylaluminum and diethylaluminum chloride, and tetraethyldialumoxane are particularly preferred.

The organoaluminum compound is used in an amount of usually from 1 to 10000 mol, and particularly preferably from 5 to 5000 mol, per mol of the titanium atom in the solid catalyst component.

The organoaluminum compound may be used as it is, or as a solution prepared using an inert diluent.

Production of Olefin Polymer

The catalyst for olefin polymerization in accordance with the present invention can be produced according to a process comprising the step of contacting with one another the above-mentioned three components, namely:

(i) the solid catalyst component containing at least titanium, magnesium and halogen atoms, (ii) the organoaluminum compound, and (iii) a compound selected from the group consisting of (a) an oxygen-containing compound having a structure wherein at least two hydrocarbyloxy groups are bound to the same carbon atom, and (b) a cyclic ketone compound.

How to contact the three components is not limited as far as the desired catalyst can be produced.

As a process for contacting them, there are exemplified the following processes (1) to (3):

(1) a process comprising the steps of diluting each of the three components with a solvent, mixing the diluted products to effect the contact, and then supplying the contact product to a polymerization reactor, (2) a process comprising the steps of mixing the three components with one another without dilution with a solvent, thereby effecting the contact, and then supplying the contact product to a polymerization reactor, and (3) a process comprising the steps of supplying the three components independently to a polymerization reactor, thereby effecting the contact in the polymerization reactor.

It is recommendable to supply the three components to the polymerization reactor under a condition freed from water using an inert gas such as a nitrogen gas and an argon gas, a hydrogen gas and an olefin gas as a carrier gas. It is permitted to supply the three components independently to the polymerization reactor. It is also permitted to contact previously at least two components among the three components, and then supply the contacted product to the polymerization reactor.

A polymerization method is not limited. For example, the polymerization can be carried out according to a conventional method such as a gas phase polymerization method and a slurry polymerization method. A temperature of the polymerization reaction is usually that at which the polymer obtained is not melted, preferably not higher than 130° C., more preferably from 20 to 110° C., and particularly preferably from 40 to 100° C. Pressure of the polymerization reaction is preferably from atmospheric pressure to 5 MPa. For the purpose of controlling a melt flow rate of the polymer obtained, it is possible to carry out the polymerization with the addition of hydrogen as a molecular weight-regulating agent. The polymerization may be carried out either in a continuous manner or in a batch manner.

A process for producing an olefin polymer in accordance with the present invention comprises the steps of obtaining the foregoing catalyst for olefin polymerization, and polymerizing an olefin in the presence of said catalyst to obtain an olefin polymer.

The "olefin polymer" in the present invention means an olefin homopolymer or an olefin copolymer obtained by polymerizing at least two kinds of olefins. Examples of the olefin copolymer are ethylene-propylene copolymer, ethylene-butene copolymer, ethylene-pentene copolymer, ethylene-hexene copolymer, ethylene-4-methyl-1-pentene copolymer, ethylene-octene copolymer, propylene-butene copolymer, propylene-hexene copolymer, propylene-4-methyl-1-pentene copolymer, ethylene-propylene-butene copolymer and ethylene-propylene-hexene copolymer. Of these, preferred is a copolymer of ethylene and an α-olefin like a linear low density polyethylene (L-LDPE) having a crystalline structure of polyethylene, which copolymer contains not less than 50% by mol of a structure unit derived from ethylene, and not less than 0.3% by mol of a structure unit derived from the α-olefin. A content of the structure unit derived from the α-olefin is preferably from 0.5 to 30% by mol, and more preferably from 1 to 20% by mol. Here, the sum of the ethylene unit content and the α-olefin unit content is 100% by mol.

Examples of the α-olefin are propylene, 1-butene, 1-pentene, 1-hexene, 3-methyl-1-pentene and 4-methyl-1-pentene. Of these, 1-butene, 1-hexene and 4-methyl-1-pentene are preferred.

EXAMPLE

The present invention is illustrated in more detail with reference to the following Examples, which are only illustrative and not intended to limit the scope of the present invention.

Analysis of the polymer, the solid catalyst component precursor and the solid catalyst component, and measurement of physical properties thereof were carried out according to the following methods.

1. Composition Analysis

A content of a structure unit derived from an α-olefin in an ethylene-α-olefin copolymer was shown in terms of a short chain branch number (SCB) per 1000 C (1000 in the number of carbon), wherein SCB was determined by a calibration curve; said calibration curve was made by characteristic absorptions of ethylene and the α-olefin; and said characteristic absorptions were determined by an infrared spectrophotometer, Series 1600, manufactured by Perkin Elmer Ltd.

2. Flow Rate (FR)

Measured at 190° C. according to ASTM D1238.

3. Flow Rate Ratio (FRR)

Flow rate ratio (FRR) was used as a measure of melt fluidity. FRR was shown in terms of a ratio of respective flow rates (FR) obtained according to the above-mentioned measuring method, wherein the load applied was 21.60 kg and 2.160 kg, namely:

FRR=(flow rate when the load was 21.60 kg)÷(flow rate when the load was 2.160 kg).

It is known that FRR value increases generally with increase of the molecular weight distribution of a polymer.

4. Content of Lower Molecular Weight Components (CXS)

Evaluated by a value of a25° C. xylene soluble matter expressed by weight percent (wt %) (CXS). In general, the larger the SCB, the larger the CXS.

5. Content of Ti

A solid component was decomposed with a diluted sulfuric acid, and an excess amount of an aqueous hydrogen peroxide solution was added to the decomposition product to obtain a liquid sample. A characteristic absorption at 410 nm of the liquid sample was measured using a double beam spectrophotometer Type U-2001, manufactured by Hitachi Co., Ltd., and then the content of Ti was determined using a calibration curve prepared in advance.

6. Content of Alkoxy Group

After decomposing a solid component with water to obtain a liquid sample, an amount of an alcohol corresponding to the alkoxy group in the obtained liquid sample was measured by an internal standard gas chromatography, followed by converting into the content of alkoxy group.

Example 1

(1) Production of Solid Catalyst Component Precursor

A reactor equipped with a stirrer was purged with nitrogen, and thereafter 800 l of hexane, 349 kg of tetraethoxysilane and 38 kg of tetrabutoxytitanium were fed therein, and stirred to obtain a mixture. To the mixture, 852 l of a dibutyl ether solution (concentration=2.1 mol/l) of butylmagnesium chloride was added dropwise over 5 hours while maintaining a temperature of the reactor at 5° C. After completion of the addition, the mixture was stirred at 8° C. for 1 hour, and additionally stirred for 1 hour at 20° C. Thereafter, the reaction mixture was filtered, and the solid obtained was washed 3 times with each 1100 l of toluene. To the solid washed, toluene was added to obtain a slurry. 50 Milliliters of the slurry were sampled, and removal of the solvent gave 8.15 g of a solid catalyst component precursor.

The solid catalyst component precursor was found to contain Ti: 2.09 wt %, ethoxy group: 38.8 wt %, and butoxy group: 2.9 wt %.

(2) Production of Solid Catalyst Component

A 200 ml-volume flask equipped with a stirrer was purged with nitrogen. The slurry obtained in the above (1), which contained 21.0 g of the solid catalyst component precursor, was fed in the flask. Using a glass tube having a filter layer made of sintering glass therein, the solvent in the slurry was removed by suction. The solid in the flask was washed 3 times with each 100 ml of heptane. Said washing and another washing mentioned below were carried out in a manner such that a solvent for washing was fed in the flask and stirred, and then the solvent was removed by suction using the above-mentioned glass tube. To the solid washed, heptane was added to obtain a heptane slurry having a total volume of 122 ml.

A 400 ml-volume autoclave equipped with a stirrer was purged with nitrogen, and thereafter the total amount of the above-mentioned heptane slurry of the solid catalyst component precursor was transferred thereto. 11.0 Milliliters of tetrachlorosilane, and 16.1 ml of (2-ethylhexyl) phthalate were added thereto in this order, and stirred at 105° C. for 3 hours to obtain a mixture. The autoclave was cooled to room temperature, and thereafter the mixture was transferred to a 200 ml-volume flask purged with nitrogen. The mixture obtained was subjected to solid-liquid separation, and the solid separated was washed three times with each 105 ml of toluene at 105° C., and then 105 ml of toluene was added to the solid washed. After raising the temperature to 70° C., 10.5 ml of titanium tetrachloride was added thereto, and the mixture was stirred at 105° C. for 1 hour. Successively, the solid separated from the stirred mixture by solid-liquid separation was washed 6 times with each 105 ml of toluene at 105° C., and additionally washed 2 times with each 105 ml of hexane at room temperature. The solid washed was dried under reduced pressure to obtain a solid catalyst component. The solid catalyst component was found to contain Ti: 1.0 wt %.

(3) Polymerization

A 3l-volume autoclave equipped with a stirrer was thoroughly dried and then made vacuum. 400 g of butane and 350 g of 1-butene were placed therein, and then a temperature was raised to 70° C. Successively, hydrogen and ethylene were introduced therein to make partial pressure 0.4 MPa and 1.2 MPa, respectively. 5.7 Millimols of triethylaluminum, 0.57 mmol of 3,3-dimethoxyhexane and 17.4 mg of the solid catalyst component obtained in the above (2) were press-fed using argon to initiate polymerization. The polymerization was continued at 70° C. for 3 hours, while continuously supplying ethylene to keep the total pressure constant.

After the polymerization reaction was over, any unreacted monomer was removed to obtain 160 g of a polymer having a good powder property. There was observed almost no adhesion of the polymer to an inner wall of the autoclave and the stirrer.

Yield of the polymer per unit amount of the catalyst (polymerization activity) was found to be 9200 g-polymer/g-solid catalyst component. The polymer was found to have SCB: 21.0, FR: 0.56, FRR: 22.7 and CXS: 10.3 wt %.

Example 2

Example 1 was repeated, except that 3,3-dimethoxyhexane in Example 1 (3) was changed to 0.57 mmol of 2,2,-dimethoxypropane, and the amount of the solid catalyst component in Example 1 (3) was changed to 14.1 mg, thereby obtaining 24 g of a polymer having a satisfactory powder property. There was observed almost no adhesion of the polymer to an inner wall of the autoclave and the stirrer.

Yield of the polymer per unit amount of the catalyst (polymerization activity) was found to be 1700 g-polymer/g-solid catalyst component. The polymer was found to have SCB: 21.1, FR: 0.36, FRR: 24.3 and CXS: 9.0 wt %.

Example 3

Example 1 was repeated, except that 3,3-dimethoxyhexane in Example 1 (3) was changed to 0.57 mmol of 1,1-dimethoxycyclohexane, and the amount of the solid catalyst component in Example 1 (3) was changed to 11.1 mg, thereby obtaining 53 g of a polymer having a good powder property. There was observed almost no adhesion of the polymer to an inner wall of the autoclave and the stirrer.

Yield of the polymer per unit amount of the catalyst (polymerization activity) was found to be 4800 g-polymer/g-solid catalyst component. The polymer was found to have SCB: 21.5, FR: 0.46, FRR: 19.9 and CXS: 9.7 wt %.

Example 4

Example 1 was repeated, except that 3,3-dimethoxyhexane in Example 1 (3) was changed to 0.57 mmol of 1,1-dimethoxyethane, and the amount of the solid catalyst component in Example 1 (3) was changed to 21.3 mg, thereby obtaining 66 g of a polymer having a good powder property. There was observed almost no adhesion of the polymer to an inner wall of the autoclave and the stirrer.

Yield of the polymer per unit amount of the catalyst (polymerization activity) was found to be 3100 g-polymer/g-solid catalyst component. The polymer was found to have SCB: 19.1, FR: 0.61, FRR: 22.3 and CXS: 7.4 wt %.

Example 5

Example 1 was repeated, except that 3,3-dimethoxyhexane in Example 1 (3) was changed to 0.57 mmol of propionaldehyde dimethylacetal, and the amount of the solid catalyst component in Example 1 (3) was changed to 16.6 mg, thereby obtaining 108 g of a polymer having a good powder property. There was observed almost no adhesion of the polymer to an inner wall of the autoclave and the stirrer.

Yield of the polymer per unit amount of the catalyst (polymerization activity) was found to be 6500 g-polymer/g-solid catalyst component. The polymer was found to have SCB: 16.0, FR: 0.78, FRR: 21.5 and CXS: 4.2 wt %.

Example 6

Example 1 was repeated, except that 3,3-dimethoxyhexane in Example 1 (3) was changed to 0.57 mmol of n-octylaldehyde dimethylacetal, and the amount of the solid catalyst component in Example 1 (3) was changed to 17.2 mg, thereby obtaining 103 g of a polymer having a good powder property. There was observed almost no adhesion of the polymer to an inner wall of the autoclave and the stirrer.

Yield of the polymer per unit amount of the catalyst (polymerization activity) was found to be 5990 g-polymer/g-solid catalyst component. The polymer was found to have SCB: 17.3, FR: 0.87, FRR: 21.7 and CXS: 5.9 wt %.

Example 7

Example 1 was repeated, except that 3,3-dimethoxyhexane in Example 1 (3) was changed to 0.057 mmol of benzaldehyde dimethylacetal, and the amount of the solid catalyst component in Example 1 (3) was changed to 11.5 mg, thereby obtaining 54.7 g of a polymer having a good powder property. There was observed almost no adhesion of the polymer to an inner wall of the autoclave and the stirrer.

Yield of the polymer per unit amount of the catalyst (polymerization activity) was found to be 4760 g-polymer/g-solid catalyst component. The polymer was found to have SCB: 15.9, FR: 0.67, FRR: 21.8 and CXS: 4.3 wt %.

Comparative Example 1

Example 1 was repeated, except that 3,3-dimethoxyhexane in Example 1 (3) was not used, and the amount of the solid catalyst component in Example 1 (3) was changed to 9.8 mg, thereby obtaining 140 g of a polymer having a good powder property. There was observed almost no adhesion of the polymer to an inner wall of the autoclave and the stirrer.

Yield of the polymer per unit amount of the catalyst (polymerization activity) was found to be 14000 g-polymer/g-solid catalyst component. The polymer was found to have SCB: 20.9, FR: 1.12, FRR: 23.0 and CXS: 11.1 wt %. It was observed that the CXS value for SCB was larger as compared with the case using the oxygen-containing compound.

Comparative Example 2

Example 1 was repeated, except that the amounts of butane and 1-butene in Example 1 (3) were changed to 380 g and 370 g, respectively, 3,3-dimethoxyhexane in Example 1 (3) was not used, and the amount of the solid catalyst component in Example 1 (3) was changed to 11.2 mg, thereby obtaining 222 g of a polymer having a good powder property. There was observed almost no adhesion of the polymer to an inner wall of the autoclave and the stirrer.

Yield of the polymer per unit amount of the catalyst (polymerization activity) was found to be 19800 g-polymer/g-solid catalyst component. The polymer was found to have SCB: 12.3, FR: 1.27, FRR: 24.5 and CXS: 13 wt %. It was observed that the CXS value for SCB was larger as compared with the case using the oxygen-containing compound.

Comparative Example 3

Example 1 was repeated, except that the amounts of butane and 1-butene in Example 1 (3) were changed to 450 g and 300 g, respectively, 3,3-dimethoxyhexane in Example 1 (3) was not used, and the amount of the solid catalyst component in Example 1 (3) was changed to 14.3 mg, thereby obtaining 245 g of a polymer having a good powder property. There was observed almost no adhesion of the polymer to an inner wall of the autoclave and the stirrer.

Yield of the polymer per unit amount of the catalyst (polymerization activity) was found to be 17100 g-polymer/g-solid catalyst component. The polymer was found to have SCB: 19.1, FR: 1.34, FRR: 24.5 and CXS: 9.1 wt %. It was observed that the CXS value for SCB was larger as compared with the case using the oxygen-containing compound.

Comparative Example 4

Example 1 was repeated, except that the amounts of butane and 1-butene in Example 1 (3) were changed to 480 g and 270 g, respectively, 3,3-dimethoxyhexane in Example 1 (3) was not used, and the amount of the solid catalyst component in Example 1 (3) was changed to 7.1 mg, thereby obtaining 105 g of a polymer having a good powder property. There was observed almost no adhesion of the polymer to an inner wall of the autoclave and the stirrer.

Yield of the polymer per unit amount of the catalyst (polymerization activity) was found to be 15000 g-polymer/g-solid catalyst component. The polymer was found to have SCB: 15.9, FR: 0.69, FRR: 25.5 and CXS: 5.4 wt %. It was observed that the CXS value for SCB was larger as compared with the case using the oxygen-containing compound.

Comparative Example 5

Example 1 was repeated, except that 3,3-dimethoxyhexane in Example 1 (3) was changed to 0.57 mmol of n-propylmethyldimethoxysilane, and the amount of the solid catalyst component in Example 1 (3) was changed to 16.1 mg, thereby obtaining 71 g of a polymer having a good powder property. There was observed almost no adhesion of the polymer to an inner wall of the autoclave and the stirrer.

Yield of the polymer per unit amount of the catalyst (polymerization activity) was found to be 4100 g-polymer/g-solid catalyst component. The polymer was found to have SCB: 13.6, FR: 0.96, FRR: 22.0 and CXS: 5.9 wt %. It was observed that the CXS value for SCB was larger as compared with the case using the oxygen-containing compound.

Comparative Example 6

Example 1 was repeated, except that 3,3-dimethoxyhexane in Example 1 (3) was changed to 0.57 mmol of dimethoxymethylsilane, and the amount of the solid catalyst component in Example 1 (3) was changed to 26.5 mg, thereby obtaining 33 g of a polymer having a good powder property. There was observed almost no adhesion of the polymer to an inner wall of the autoclave and the stirrer.

Yield of the polymer per unit amount of the catalyst (polymerization activity) was found to be 1300 g-polymer/g-solid catalyst component. The polymer was found to have SCB: 17.5, FR: 0.58, FRR: 20.8 and CXS: 7.3 wt %. It was observed that the CXS value for was larger as compared with the case using the oxygen-containing compound.

Comparative Example 7

Example 1 was repeated, except that 3,3-dimethoxyhexane in Example 1 (3) was changed to 0.57 mmol of 2,2-di-i-butyl-1,3-dimethoxypropane, and the amount of the solid catalyst component in Example 1 (3) was changed to 16.5 mg, thereby obtaining 71 g of a polymer having a good powder property. There was observed almost no adhesion of the polymer to an inner wall of the autoclave and the stirrer.

Yield of the polymer per unit amount of the catalyst (polymerization activity) was found to be 4300 g-polymer/g-solid catalyst component. The polymer was found to have SCB: 22.2, FR: 1.68, FRR: 23.4 and CXS: 16.0 wt %. It was observed that the CXS value for SCB was larger as compared with the case using the oxygen-containing compound.

Example 8

(1) Production of Solid Catalyst Component Precursor

A reactor equipped with a stirrer was purged with nitrogen, and thereafter 800 l of hexane, 349 kg of tetraethoxysilane and 38 kg of tetrabutoxytitanium were fed therein, and stirred to obtain a mixture. To the mixture, 852 l of a dibutyl ether solution (concentration =2.1 mol/l) of butylmagnesium chloride was added dropwise over 5 hours while maintaining a temperature of the reactor at 5° C. After completion of the addition, the mixture was stirred at 8° C. for 1 hour, and additionally stirred for 1 hour at 20° C. Thereafter, the reaction mixture was filtered, and the solid obtained was washed 3 times with each 1100 l of toluene. To the solid washed, toluene was added to obtain a slurry. 50 Milliliters of the slurry were sampled, and removal of the solvent gave 8.15 g of a solid catalyst component precursor.

The solid catalyst component precursor was found to contain Ti: 2.09 wt %, ethoxy group: 38.8 wt %, and butoxy group: 2.9 wt %.

(2) Production of Solid Catalyst Component

A 200 ml-volume flask equipped with a stirrer was purged with nitrogen. The slurry obtained in the above (1), which contained 21.0 g of the solid catalyst component precursor, was fed in the flask. Using a glass tube having a filter layer made of sintering glass therein, the solvent in the slurry was removed by suction. The solid in the flask was washed 3 times with each 100 ml of heptane. To the solid washed, heptane was added to obtain a heptane slurry having a total volume of 122 ml.

A 400 ml-volume autoclave equipped with a stirrer was purged with nitrogen, and thereafter the total amount of the above-mentioned heptane slurry of the solid catalyst component precursor was transferred thereto. 11.0 Milliliters of tetrachlorosilane, and 16.1 ml of (2-ethylhexyl) phthalate were added thereto in this order, and stirred at 105° C. for 3 hours to obtain a mixture. The autoclave was cooled to room temperature, and thereafter the mixture was transferred to a 200 ml-volume flask purged with nitrogen. The mixture obtained was subjected to solid-liquid separation, and the solid separated was washed 3 times with each 105 ml of toluene at 105° C., and then 105 ml of toluene was added to the solid washed. After raising the temperature to 70° C., 10.5 ml of titanium tetrachloride was added thereto, and the mixture was stirred at 105° C. for 1 hour. Successively, the solid separated from the stirred mixture by solid-liquid separation was washed 6 times with each 105 ml of toluene at 105° C., and additionally washed 2 times with each 105 ml of hexane at room temperature. The solid washed was dried under reduced pressure to obtain a solid catalyst component. The solid catalyst component was found to contain Ti: 1.0 wt %.

(3) Polymerization

A 3 l -volume autoclave equipped with a stirrer was thoroughly dried and then made vacuum. 400 Grams of butane and 350 g of 1-butene were placed therein, and then a temperature was raised to 70° C. Successively, hydrogen and ethylene were introduced therein to make partial pressure 0.4 MPa and 1.2 MPa, respectively. 5.7 Millimols of triethylaluminum, 0.57 mmol of 1,4-cyclohexanedione and 20.6 mg of the solid catalyst component obtained in the above (2) were press-fed using argon to initiate polymerization. The polymerization was continued at 70° C. for 3 hours, while continuously supplying ethylene to keep the whole pressure constant.

After the polymerization reaction was over, any unreacted monomer was removed to obtain 148 g of a polymer having a good powder property. There was observed almost no adhesion of the polymer to an inner wall of the autoclave and the stirrer.

Yield of the polymer per unit amount of the catalyst (polymerization activity) was found to be 7180 g-polymer/g-solid catalyst component. The polymer was found to have SCB: 19.4, FR: 1.01, FRR: 23.1 and CXS: 8.2 wt %.

Example 9

Example 8 was repeated, except that 1,4-cyclohexanedione in Example 8 (3) was changed to 0.57 mmol of 1,3-cyclohexanedione, and the amount of the solid catalyst component in Example 8 (3) was changed to 19.7 mg, thereby obtaining 215 g of a polymer having a good powder property. There was observed almost no adhesion of the polymer to an inner wall of the autoclave and the stirrer.

Yield of the polymer per unit amount of the catalyst (polymerization activity) was found to be 10900 g-polymer/g-solid catalyst component. The polymer was found to have SCB: 20.8, FR: 0.88, FRR: 22.4 and CXS: 9.8 wt %.

Example 10

Example 8 was repeated, except that 1,4-cyclohexanedione in Example 8 (3) was changed to 0.57 mmol of 1,2-cyclohexanedione, and the amount of the solid catalyst component in Example 8 (3) was changed to 11.6 mg, thereby obtaining 111 g of a polymer having a good powder property. There was observed almost no adhesion of the polymer to an inner wall of the autoclave and the stirrer.

Yield of the polymer per unit amount of the catalyst (polymerization activity) was found to be 9570 g-polymer/g-solid catalyst component. The polymer was found to have SCB: 21.2, FR: 0.86, FRR: 23.0 and CXS: 10.2 wt %.

Example 11

Example 8 was repeated, except that 1,4-cyclohexanedione in Example 8 (3) was changed to 0.57 mmol of 1,4-benzoquinone, and the amount of the solid catalyst component in Example 8 (3) was changed to 18.2 mg, thereby obtaining 189 g of a polymer having a good powder property. There was observed almost no adhesion of the polymer to an inner wall of the autoclave and the stirrer.

Yield of the polymer per unit amount of the catalyst (polymerization activity) was found to be 10400 g-polymer/g-solid catalyst component. The polymer was found to have SCB: 22.3, FR: 1.31, FRR: 21.8 and CXS: 11.7 wt %.

Comparative Example 8

Example 8 was repeated, except that 1,4-cyclohexanedione in Example 8 (3) was not used, and the amount of the solid catalyst component in Example 8 (3) was changed to 9.8 mg, thereby obtaining 140 g of a polymer having a good powder property. There was observed almost no adhesion of the polymer to an inner wall of the autoclave and the stirrer.

Yield of the polymer per unit amount of the catalyst (polymerization activity) was found to be 14000 g-polymer/g-solid catalyst component. The polymer was found to have SCB: 20.9, FR: 1.12, FRR: 23.0 and CXS: 11.1 wt %. It was observed that the CXS value for SCB was larger as compared with the case using the cyclic ketone compound.

Comparative Example 9

Example 8 was repeated, except that the amounts of butane and 1-butene in Example 8 (3) were changed to 380 g, and 370 g, respectively, 1,4-cyclohexanedione in Example 8 (3) was not used, and the amount of the solid catalyst component in Example 8 (3) was changed to 11.2 mg, thereby obtaining 222 g of a polymer having a good powder property. There was observed almost no adhesion of the polymer to an inner wall of the autoclave and the stirrer.

Yield of the polymer per unit amount of the catalyst (polymerization activity) was found to be 19800 g-polymer/g-solid catalyst component. The polymer was found to have SCB: 12.3, FR: 1.27, FRR: 24.5 and CXS: 13 wt %. It was observed that the CXS value for SCB was larger as compared with the case using the cyclic ketone compound.

Comparative Example 10

Example 8 was repeated, except that the amounts of butane and 1-butene in Example 8 (3) were changed to 450 g, and 300 g, respectively, 1,4-cyclohexanedione in Example 8 (3) was not used, and the amount of the solid catalyst component in Example 8 (3) was changed to 14.3 mg, thereby obtaining 245 g of a polymer having a good powder property. There was observed almost no adhesion of the polymer to an inner wall of the autoclave and the stirrer.

Yield of the polymer per unit amount of the catalyst (polymerization activity) was found to be 17100 g-polymer/g-solid catalyst component. The polymer was found to have SCB: 19.1, FR: 1.34, FRR: 24.5 and CXS: 9.1 wt %. It was observed that the CXS value for SCB was larger as compared with the case using the cyclic ketone compound.

Comparative Example 11

Example 8 was repeated, except that the amounts of butane and 1-butene in Example 8 (3) were changed to 480 g, and 270 g, respectively, 1,4-cyclohexanedione in Example 8 (3) was not used, and the amount of the solid catalyst component in Example 8 (3) was changed to 7.1 mg, thereby obtaining 105 g of a polymer having a good powder property There was observed almost no adhesion of the polymer to an inner wall of the autoclave and the stirrer.

Yield of the polymer per unit amount of the catalyst (polymerization activity) was found to be 15000 g-polymer/g-solid catalyst component. The polymer was found to have SCB: 15.9, FR: 0.69, FRR: 25.5 and CXS: 5.4 wt %. It was observed that the CXS value for SCB was larger as compared with the case using the cyclic ketone compound.

What is claimed is:

1. A process for producing a catalyst for olefin polymerization, which comprises the step of contacting with one another:
   (i) a solid catalyst component containing at least titanium, magnesium and halogen atoms,
   (ii) an organoaluminum compound, and
   (iii) a compound selected from the group consisting of (a) an oxygen-containing compound having a structure wherein at least two hydrocarbyloxy groups are bound to the same carbon atom, and (b) a cyclic ketone compound, wherein the solid catalyst component is produced by a process comprising the step of contacting (a) a solid catalyst component precursor containing a magnesium atom, a titanium atom and a hydrocarbyloxy group, (b) a halogeno compound having a capability of halogenation and (c) an electron donor with one another.

2. The process for producing a catalyst for olefin polymerization according to claim 1, wherein the oxygen-containing compound contains a compound represented by the following formula,

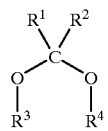

wherein $R^1$ and $R^2$ are independently of each other a hydrogen atom or a hydrocarbon group having 1 to 20 carbon atoms, and $R^1$ and $R^2$ may be bound to each other to form a ring, and $R^3$ and $R^4$ are independently of each other a hydrocarbon group having 1 to 20 carbon atoms.

3. The process for producing a catalyst for olefin polymerization according to claim 1, wherein the oxygen-containing compound contains a saturated aliphatic ketone or an acetal formed from a saturated aliphatic aldehyde and an alcohol.

4. The process for producing a catalyst for olefin polymerization according to claim 1, wherein the cyclic ketone compound contains a 3- to 10-membered cyclic ketone.

5. The process for producing a catalyst for olefin polymerization according to claim 1, wherein the cyclic ketone compound contains a compound having at least two carbonyl groups in its ring.

6. The process for producing a catalyst for olefin polymerization according to claim 1, wherein the electron donor contains an organic acid ester.

7. A process for producing an olefin polymer, which comprises the steps of:

(1) contacting with one another (i) a solid catalyst component containing at least titanium, magnesium and halogen atoms, (ii) an organoaluminum compound and (iii) a compound selected from the group consisting of (a) an oxygen-containing compound having a structure wherein at least two hydrocarbyloxy groups are bound to the same carbon atom and (b) a cyclic ketone compound to obtain a catalyst for olefin polymerization, and (2) polymerizing an olefin in the presence of the obtained catalyst for olefin polymerization to obtain an olefin polymer, wherein the solid catalyst component is produced by a process comprising the step of contacting (a) a solid catalyst component precursor containing a magnesium atom, a titanium atom and a hydrocarbyloxy group, (b) a halogeno compound having a capability of halogenation and (c) an electron donor with one another.

8. The process for producing an olefin polymer according to claim 7, wherein the olefin polymer contains a copolymer of ethylene and an α-olefin.

* * * * *